US010400743B1

(12) United States Patent
Kelley et al.

(10) Patent No.: US 10,400,743 B1
(45) Date of Patent: Sep. 3, 2019

(54) WIND TURBINE BLADES, WIND TURBINES, AND WIND FARMS HAVING INCREASED POWER OUTPUT

(71) Applicant: National Technology & Engineering Solutions of Sandia, LLC, Albuquerque, NM (US)

(72) Inventors: Christopher Lee Kelley, Albuquerque, NM (US); David Charles Maniaci, Albuquerque, NM (US); Brian R. Resor, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 185 days.

(21) Appl. No.: 14/979,080

(22) Filed: Dec. 22, 2015

Related U.S. Application Data

(60) Provisional application No. 62/096,644, filed on Dec. 24, 2014.

(51) Int. Cl.
*F03D 1/06* (2006.01)
(52) U.S. Cl.
CPC .................................. *F03D 1/0633* (2013.01)
(58) Field of Classification Search
CPC .................................................... F03D 1/0633
See application file for complete search history.

(56) References Cited

U.S. PATENT DOCUMENTS

| 7,299,627 | B2* | 11/2007 | Corten | F03D 1/04 60/398 |
| 7,357,622 | B2* | 4/2008 | Corten | F03B 15/06 415/66 |
| 8,182,231 | B2* | 5/2012 | Corten | F03D 1/0641 416/223 R |
| 9,057,359 | B2* | 6/2015 | Fuglsang | F03D 1/0641 |
| 9,797,368 | B2* | 10/2017 | Corten | F03D 1/0608 |
| 2006/0131889 | A1* | 6/2006 | Corten | F03D 1/04 290/43 |
| 2006/0232073 | A1* | 10/2006 | Corten | F03B 15/06 290/44 |
| 2009/0068018 | A1* | 3/2009 | Corten | F03D 1/0641 416/223 R |
| 2009/0099702 | A1 | 4/2009 | Vyas et al. | |

(Continued)

FOREIGN PATENT DOCUMENTS

WO   WO 2013037374 A1 *  3/2013  .............. F03D 7/028

OTHER PUBLICATIONS

W.A. Timmer, An overview of NACA 6-digit airfoil series characteristics with reference to airfoils for large wind turbine blades, Jan. 2009, AIAA 2009-268.*

(Continued)

*Primary Examiner* — Eldon T Brockman
(74) *Attorney, Agent, or Firm* — Daniel J. Jenkins

(57) ABSTRACT

A wind turbine blade having a geometry that decreases the distance downstream at which freestream momentum is recovered is disclosed. The blade design increases the loading on the inboard portion of the blade and unloads the tip portion relative to a conventional blade designed to maximize power coefficient. A wind farm having a reduced inter-turbine distance and including one or more wind turbines having the new blade designs is also disclosed.

15 Claims, 10 Drawing Sheets

(56) References Cited

U.S. PATENT DOCUMENTS

| | | | | |
|---|---|---|---|---|
| 2011/0176926 A1* | 7/2011 | Corten | ............ | F03D 1/0608 |
| | | | | 416/223 R |
| 2012/0057984 A1* | 3/2012 | Fuglsang | ............ | F03D 1/0641 |
| | | | | 416/234 |
| 2012/0057987 A1* | 3/2012 | Fuglsang | ............ | F03D 1/0641 |
| | | | | 416/241 R |

OTHER PUBLICATIONS

Bjorck, Coordinates and Calculations for the FFA-Wi-xxx, FFA-W2-xxx and FFA-W3-xxx Series of Airfoils for Horizontal Axis Wind Turbines, 1990, Flygtekniska Forsoksanstalten, FFA TN 1990-15, p. 14.*

* cited by examiner

WIND TURBINE BLADES, WIND TURBINES, AND WIND FARMS HAVING INCREASED POWER OUTPUT

CROSS-REFERENCE TO RELATED APPLICATIONS

This application claims priority to provisional patent application U.S. Ser. No. 62/096,644, entitled "SYSTEMS, TURBINES AND METHODS FOR WIND FARM ENERGY PRODUCTION," by Kelley et al., filed Dec. 24, 2014, the disclosure of which is incorporated herein by reference in its entirety.

STATEMENT CONCERNING FEDERALLY SPONSORED RESEARCH

This invention was developed under Contract DE-AC04-94AL85000 between Sandia Corporation and the United States Department of Energy.

FIELD OF THE INVENTION

The present invention relates to the field of wind energy, and specifically to wind turbine blades having reduced wake that results in increased wind farm energy production.

BACKGROUND OF THE INVENTION

Wind turbines are used to generate energy for both local use and to support energy grid operations. A plurality of wind turbines are often arranged in wind farms. However, the wake from one or more of the wind turbines can interfere with the efficient operation of other wind turbines within the farm.

What is needed is a wind turbine blade for a wind turbine having reduced wake that can be arranged in a wind farm operating arrangement having improved efficiency, performance and reliability.

SUMMARY OF THE INVENTION

The disclosure is directed to a wind turbine blade having a blade geometry that increases loading on the inboard region of the blade and unloads the tip region.

The disclosure is also directed to a wind turbine having wind turbine blades having a blade geometry that increases loading on the inboard region of the blade and unloads the tip region.

The disclosure is also directed to a wind farm having a wind turbine having wind turbine blades having a blade geometry that increases loading on the inboard region of the blade and unloads the tip region.

According to an embodiment of the disclosure, a turbine blade is disclosed that includes an inboard region and an outboard region. The inboard region has an induction factor of between $1/3$ and $1/2$, and the outboard region has an average induction factor between 0 and $1/3$.

According to another embodiment of the disclosure, a wind turbine is disclosed that includes at least one turbine blade having an inboard region; and an outboard region. The inboard region has an induction factor of between $1/3$ and $1/2$, and the outboard region has an average induction factor between 0 and $1/3$.

According to another embodiment of the disclosure, a wind farm is disclosed having two or more wind turbines having at least one wind turbine blade including an inboard region and an outboard region. The inboard region has an induction factor of between $1/3$ and $1/2$, and the outboard region has an average induction factor between 0 and $1/3$.

An advantage of the disclosed blade geometry is that wind turbines using the disclosed blade geometry may be more closely spaced in a wind farm due to reduced array losses, thereby increasing the energy extracted from the wind on a given area of land.

Another advantage would be that new wind farms could take up less land since turbines could be placed closer together.

Other features and advantages of the present invention will be apparent from the following more detailed description of the preferred embodiment, taken in conjunction with the accompanying drawings which illustrate, by way of example, the principles of the invention

BRIEF DESCRIPTION OF THE DRAWINGS

The figures depict embodiments of the present invention for purposes of illustration only, and are not necessarily drawn to scale. One skilled in the art will readily recognize from the following discussion that alternative embodiments of the structures and methods illustrated herein may be employed without departing from the principles of the invention described herein.

DETAILED DESCRIPTION OF THE INVENTION

The present disclosure is directed to a wind turbine blade that reduces the length of the wake following it without a significant loss of rotor efficiency. This is done by changing the chord and twist of the blade such that there are relatively high blade forces of the inboard region, and relatively low blade forces in the outboard region. By increasing the inboard region loading, the tangential velocity or angular momentum is also increased. This is known to affect the stability of a wake in addition to the larger axial velocity gradients in the near wake.

In this application, the following terms are defined as follows:

Induction is the percentage that the axial velocity is slowed down relative to the incoming wind at the rotor plane. It is conventionally defined either as an azimuthal average or relative to the blade. The ranges of induction factor listed in this disclosure are in reference to values predicted by a conventional implementation of blade element momentum theory and includes equivalent ranges from other analysis methods.

The disclosed blade geometry creates greater mixing and a quicker collapse of the wake than present designs. In an embodiment, the disclosed blade geometry results in a recovery to 50% of the freestream momentum at a distance of 5 rotor radii closer than conventional maximum efficiency designs, in contrast to conventional blade designs (see Blade A below) that has a recovery to 50% of the freestream momentum at a distance of 11 rotor radii. The disclosed wind turbine blade geometry decreases the distance downstream at which freestream momentum is recovered, and this effect has been shown to be sensitive to blade loading. The disclosed wind turbine blade reduces the length of the wake following it without a significant loss of rotor efficiency.

Figure 1:
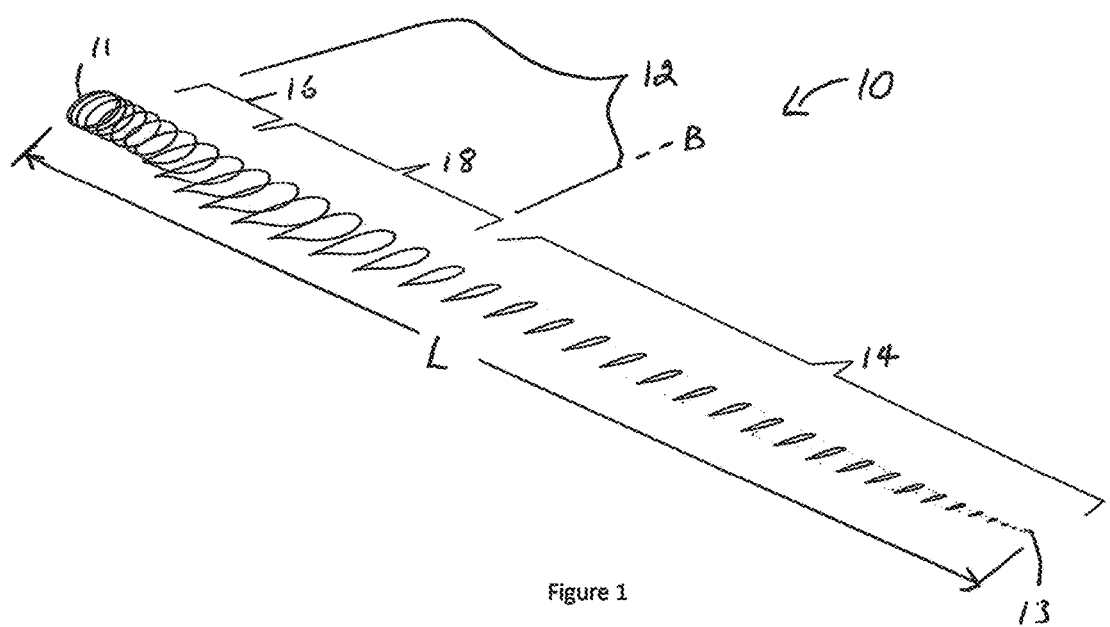
FIG. 1 illustrates an embodiment of a wind turbine blade according to the present disclosure.

FIG. 1 illustrates an embodiment of a wind turbine blade (blade) 10 according to the present disclosure. Blade 10 has a blade geometry having a chord and twist such that there are relatively high blade forces of the inboard region, and relatively low blade forces outboard.

As can be seen in FIG. 1, the blade 10 includes an inboard section, portion or region 12 and a tip or outboard section, portion or region 14 disposed between a base 11 and a tip 13. In this exemplary embodiment, the inboard region 12 includes a root region 16 and an inboard aerodynamic region 18. In another embodiment, the root region 16 may be omitted, and the inboard aerodynamic region 18 may directly attach to the wind turbine rotor hub (see FIG. 4).

In this exemplary embodiment, the inboard aerodynamic region 18 has an induction value of 0.41. In an embodiment, the inboard aerodynamic region 18 has an induction value of no less than ⅓ and no greater than ½. In another embodiment, the inboard aerodynamic region 18 has an induction value of no less than 0.35 and no greater than 0.45.

Further in this exemplary embodiment, the root region 16 and inboard aerodynamic region 18 is 60% of the Length L of the turbine blade 10. In another embodiment, the root region 16 and inboard aerodynamic region 18 is 75% of the Length L of the turbine blade 10. In another embodiment, the root region 16 and inboard aerodynamic region 18 is between 60% and 97% of the Length L of the turbine blade. In yet another embodiment, the root region 16 and inboard aerodynamic region 18 is between 75% and 85% of the Length L of the turbine blade 10.

Also in this exemplary embodiment, the inboard aerodynamic region 18 uses a DU 00-W-401 airfoil. In this disclosure, the term DU 00-W-401, NACA $63_6$-621, and other airfoil designations are well known in the art and, as used herein, are as set forth in T. Burton et al. "Wind Energy Handbook," 2001 and Abbott and Von Doenhoff "Theory of Wind Sections," 1959. In another embodiment, the inboard aerodynamic region 18 may include one or more aerodynamic airfoil sections, such as, but not limited to DU 00-W-401, DU 00-W-350, DU 97-W-300, DU 91-W2-250, and NACA $63_6$-621.

In this exemplary embodiment, the outboard region 14 has an average induction value of 0.2. In another embodiment, the outboard region 14 has an average induction value of no less than 0 and no greater than ⅓.

Further in this exemplary embodiment, the outboard region 14 is 40% of the Length L of the turbine blade 10. In another embodiment, the outboard region 14 is 25% of the Length L of the turbine blade 10. In another embodiment, the outboard region 14 is between 3% and 40% of the Length L of the turbine blade. In yet another embodiment, the outboard region 14 is between 15% and 25% of the Length L of the turbine blade 10. A boundary "B", between the inboard region 12 and outboard region 14, shall be located at no less than 60% span (r/R=0.60) and no more 97% span (r/R=0.97).

Also in this exemplary embodiment, the outboard region 14 uses a NACA $63_6$-618 airfoil. In another embodiment, the outboard region 14 may include one or more airfoils, such as, but not limited to NACA $63_6$-618 and NACA $63_6$-621.

Figure 2:
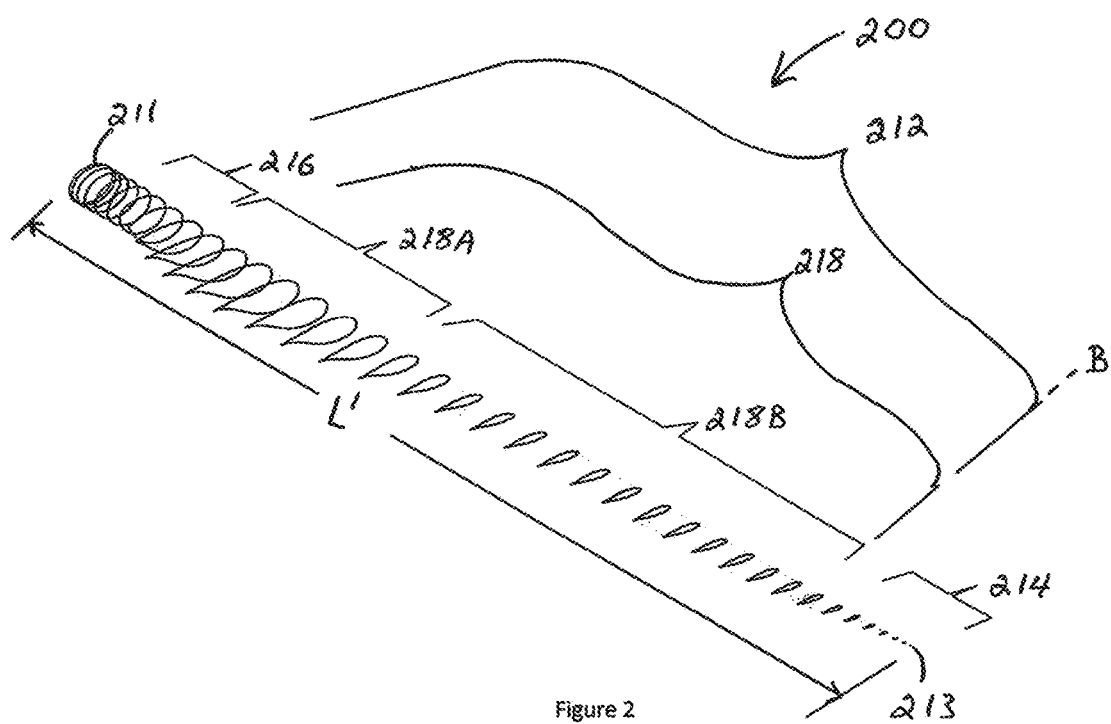
FIG. 2 illustrates another embodiment of a wind turbine blade according to the present disclosure.

FIG. 2 illustrates another embodiment of a Blade 200 according to the present disclosure. As can be seen in FIG. 2, the blade 200 includes an inboard region 212 and an outboard or tip region 214 disposed between a base 211 and a tip 213. In this exemplary embodiment, the inboard region 212 includes a root region 216 and an inboard aerodynamic region 218. In another embodiment, the root region 216 may be omitted, and the inboard aerodynamic region 218A may directly attach to the wind turbine rotor hub (see FIG. 4).

In this exemplary embodiment, the inboard aerodynamic region 218 has an induction value of 0.41. In an embodiment, the inboard aerodynamic region 218 has an induction value of no less than ⅓ and no greater than ½. In another embodiment, the inboard aerodynamic region 218 has an induction value of no less than ⅓ and no greater than ½. In another embodiment, the inboard aerodynamic region 218 has an induction value of no less than 0.35 and no greater than 0.45.

Further in this exemplary embodiment, the root region 216 and inboard aerodynamic region 218 is 90% of the Length L' of the turbine blade 200. In another embodiment, the root region 216 and inboard aerodynamic region 218 is 75% of the Length L' of the turbine blade 200. In another embodiment, the root region 216 and inboard aerodynamic region 218 is between 60% and 97% of the Length L' of the turbine blade 200. In yet another embodiment, the root region 216 and inboard aerodynamic region 218 is between 75% and 85% of the Length L' of the turbine blade 200.

Also in this exemplary embodiment, the inboard aerodynamic region 218 includes a first inboard aerodynamic region 218A conforming to DU 00-W-401 airfoil and a second inboard aerodynamic region 218B conforming to a NACA $63_6$-621 design, respectively, from the root region 216 to the outboard region 214. In another embodiment, the inboard aerodynamic region 218 may include one or more aerodynamic designs, such as, but not limited to DU 00-W-401, DU 00-W-350, DU 97-W-300, DU 91-W2-250, and NACA $63_6$-621.

In this exemplary embodiment, the outboard region 214 has an average induction value of 0.2. In another embodiment, the outboard region 214 has an average induction value of no less than 0 and no greater than ⅓

Further in this exemplary embodiment, the outboard region 214 is 10% of the Length L' of the turbine blade 200. In another embodiment, the outboard region 214 is 25% of the Length L' of the turbine blade 200. In another embodiment, the outboard region 214 is between 3% and 40% of the Length L of the turbine blade 200. In yet another embodiment, the outboard region 214 is between 15% and 25% of the Length L' of the turbine blade 200. A boundary "B", between the inboard region 12 and outboard region 14, is located at no less than 60% span (r/R=0.60) and no more 97% span (r/R=0.95).

Also in this exemplary embodiment, the outboard region 214 uses a NACA $63_6$-618 airfoil. In another embodiment, the outboard region 214 may include one or more airfoils, such as, but not limited to NACA $63_6$-618 and NACA $63_6$-621.

Figure 3:
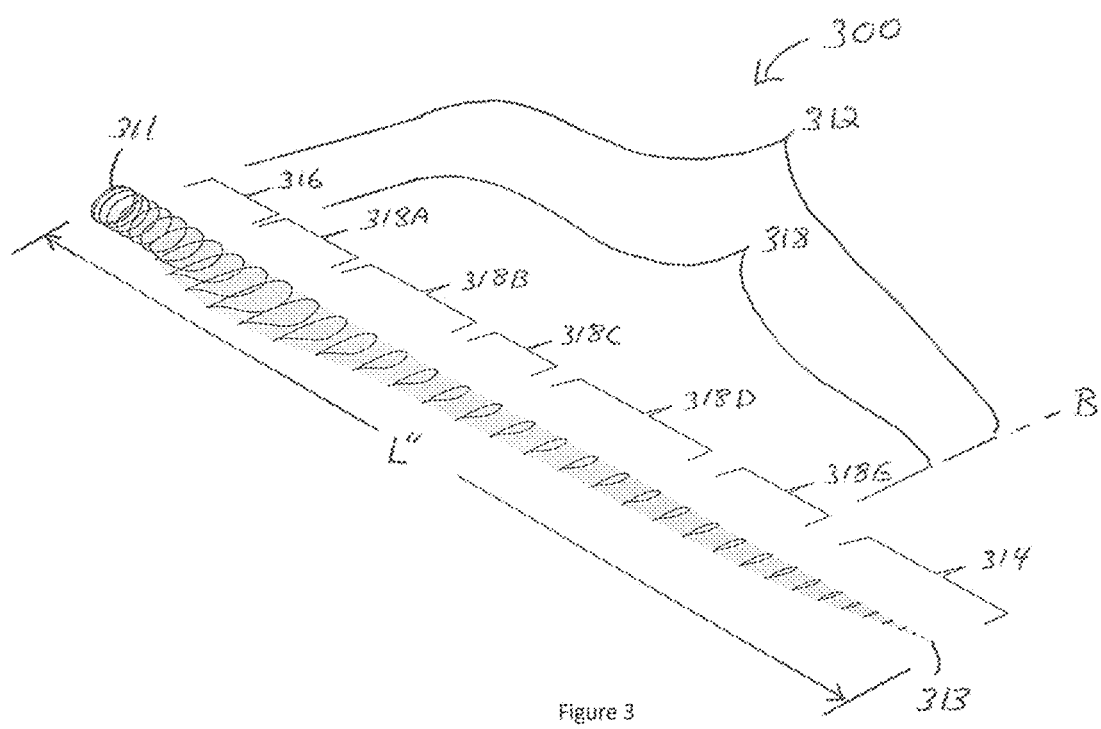
FIG. 3 illustrates another embodiment of a wind turbine blade according to the present disclosure.

FIG. 3 illustrates another embodiment of a Blade 300 according to the present disclosure. As can be seen in FIG. 3, the blade 300 includes an inboard region 312 and an outboard or tip region 314 disposed between a base 311 and a tip 313. In this exemplary embodiment, the inboard region 312 includes a root region 316 and an inboard aerodynamic region 318. In another embodiment, the root region 316 may be omitted, and the inboard aerodynamic region 318 may directly attach to the wind turbine hub (see FIG. 4, number 520).

In this exemplary embodiment, the inboard aerodynamic region 318 has an induction value of 0.41. In an embodiment, the inboard aerodynamic region 318 has an induction value of no less than ⅓ and no greater than ½. In another embodiment, the inboard aerodynamic region 318 has an induction value of no less than 0.35 and no greater than 0.45.

Further in this exemplary embodiment, the root region 316 and inboard aerodynamic region 318 is 90% of the Length L" of the turbine blade 300. In another embodiment, the root region 316 and inboard aerodynamic region 318 is 75% of the Length L" of the turbine blade 300. In another embodiment, the root region 316 and inboard aerodynamic region 318 is between 60% and 97% of the Length L" of the turbine blade 300. In yet another embodiment, the root region 316 and inboard aerodynamic region 318 is between 75% and 85% of the Length L" of the turbine blade 300.

Also in this exemplary embodiment, the inboard aerodynamic region 318 includes a first inboard aerodynamic region 318A conforming to DU 00-W-401, a second inboard aerodynamic region 318B conforming to DU 00-W-350, a third inboard aerodynamic region 318C conforming to DU 97-W-300, a fourth inboard aerodynamic region 318D conforming to DU 91-W2-250 and a fifth inboard aerodynamic region 318E conforming to NACA $63_6$-621 design, respectively, from the root region 316 to the outboard region 314. In another embodiment, the inboard aerodynamic region 318 may include one or more aerodynamic designs, such as, but not limited to DU 00-W-401, DU 00-W-350, DU 97-W-300, DU 91-W2-250, and NACA $63_6$-621.

In this exemplary embodiment, the outboard region 314 has an average induction value of 0.2. In another embodiment, the outboard region 14 has an average induction value of no less than 0 and no greater than ⅓

Further in this exemplary embodiment, the outboard region 314 is 10% of the Length L" of the turbine blade. In another embodiment, the outboard region 314 is 25% of the Length L" of the turbine blade 300. In another embodiment, the outboard region 314 is between 3% and 40% of the Length L" of the turbine blade 300. In yet another embodiment, the outboard region 314 is between 15% and 25% of the Length L" of the turbine blade 300. A boundary "B", between the inboard region 312 and outboard region 14, shall be located at no less than 60% span (r/R=0.60) and no more 97% span (r/R=0.95).

Also in this exemplary embodiment, the outboard region 314 uses a NACA $63_6$-618 airfoil. In another embodiment, the outboard region 314 may include one or more airfoils, such as, but not limited to NACA $63_6$-618 and NACA $63_6$-621.

Figure 4:
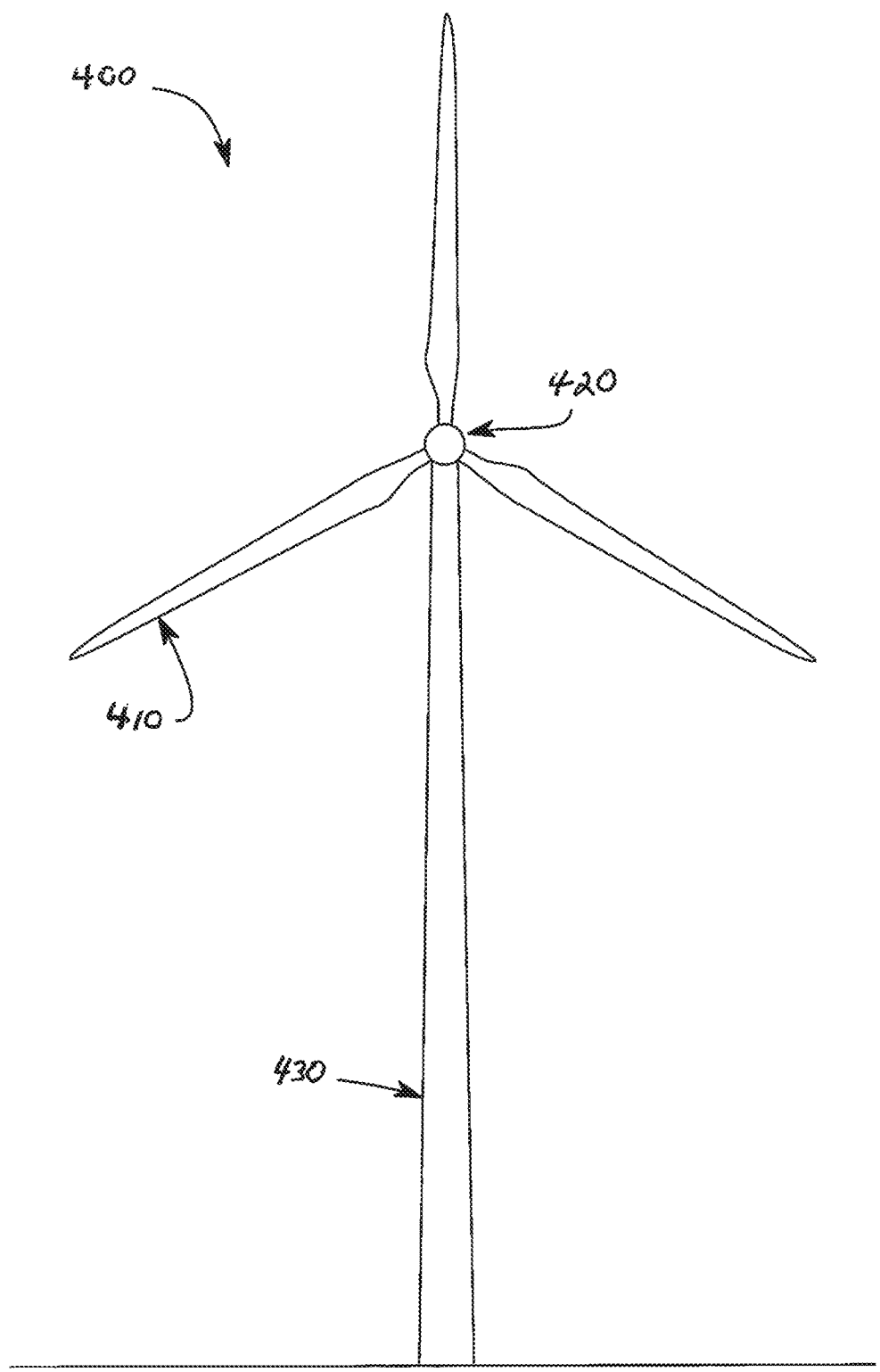
FIG. 4 illustrates a wind turbine according to an embodiment of the disclosure.

FIG. 4 illustrates a wind turbine 400 according to an embodiment of the disclosure. As can be seen in FIG. 4, the wind turbine 400 includes three blades 410 attached to a hub 420, which is attached to a tower 430. The blades 410 are the novel blades as disclosed herein having blade geometries having a chord and twist such that there are relatively high blade forces of the inboard region and relatively low blade forces outboard. In this exemplary embodiment, the wind turbine 400 has three blades 410, in other embodiments; the wind turbine 400 may have one or more blades 410.

Figure 5:
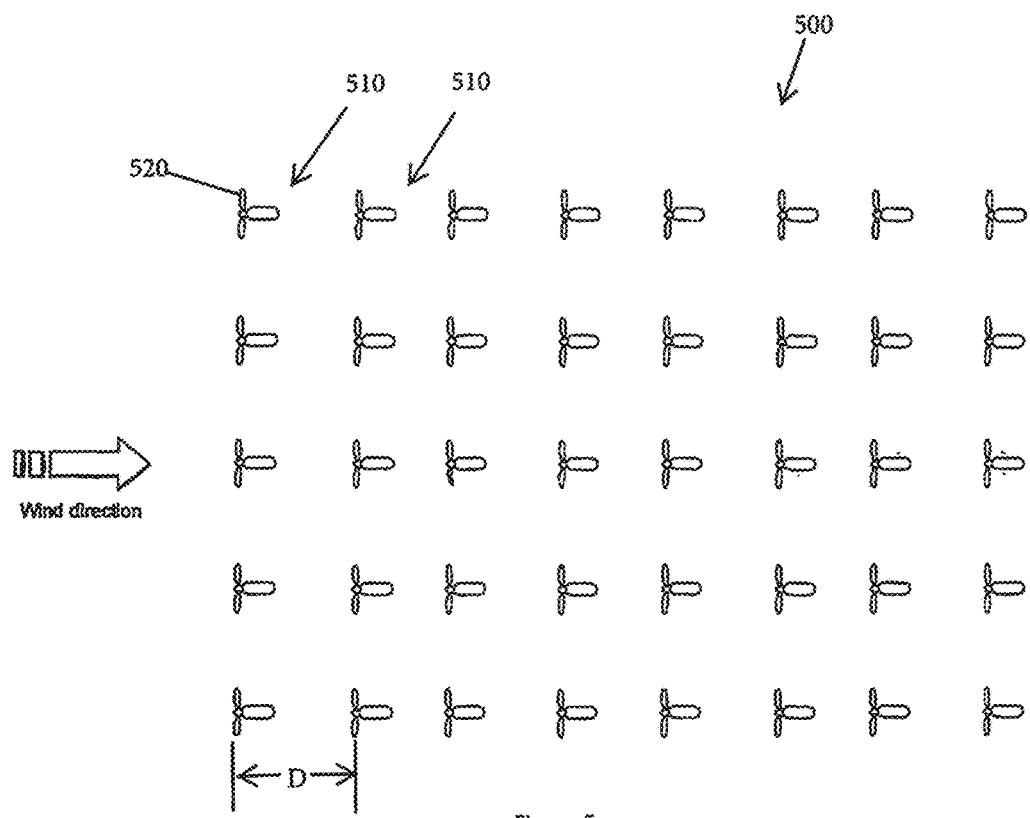
FIG. 5 illustrates a wind turbine farm according to an embodiment of the disclosure.

FIG. 5 illustrates a wind farm 500 that includes a plurality of wind turbines 510 having two blades 520. The blades 520 are the novel blades as disclosed herein having blade geometries having a chord and twist such that there are relatively high blade forces of the inboard region, and relatively low blade forces outboard. In this exemplary embodiment, the wind turbines 510 has two blades 520, in other embodiments, the wind turbine 510 may have two or more blades 520. Because of the reduced wake formed by the blades 520 of the wind turbines 510, the wind turbines 510 may be arranged at a separation distance D that is less than achievable in conventional wind farms that utilize wind turbines generating conventional wakes. Alternatively, the blades could be retrofit to existing wind farms to reduce the wake effect in the array and increase annual energy production.

To verify that this approach reduces the length of wake created by a turbine having the novel turbine blade design, the new design was simulated using a free-wake vortex method, which has been proven to predict the performance and wakes for a variety of other wind turbines measured in experiment. The model shows that this new blade design creates greater mixing and a quicker collapse of the wake than a textbook design (one for maximum power, referred to as Design A (see below)). This new blade design saw a recovery (to 50% of the freestream momentum) at a distance of 5 rotor radii closer than the original maximum efficiency design. An advantage of the new design includes closer spacing of wind turbines with reduced array losses thereby increasing the energy extracted from the wind on a given area of land.

EXAMPLE

Conventional Blade A (Blade A)—$C_{Pmax}$

Figure 6:
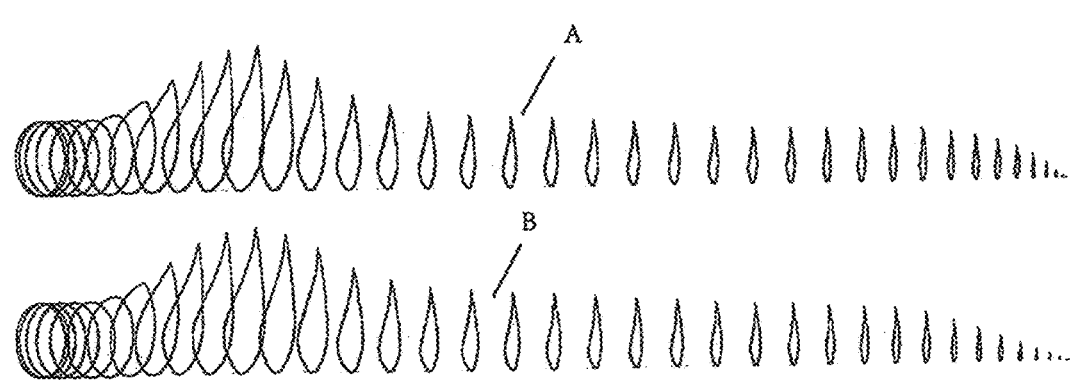
FIG. 6 shows an illustration comparing Conventional Blade A to Blade B of an embodiment of the present disclosure.

FIG. 6 illustrates an embodiment of a Blade A, which is a conventional blade design. Blade A was designed to have a maximum power coefficient for a tip speed ratio, λ=9. The airfoil distribution along the span was chosen to be similar to other blade designs which start with thick airfoils near the blade root and transition to thin airfoils near the blade tip. The operating angle of attack and lift coefficient were chosen for each airfoil's maximum lift-to-drag ratio. A summary of the chosen airfoil locations, their maximum lift-to-drag ratios, and the corresponding lift coefficients and angle of attacks for design A are seen in Table 1. Rough airfoil data was used for the NACA $63_6$-618 airfoil to be better representative of a soiled/eroded blade in operation.

TABLE 1

Airfoils and Operating Points for Design A and B

| Section | Shape | $\frac{r}{R}$ | $\frac{L}{D}_{max}$ | $C_l$ | $\alpha°$ |
|---|---|---|---|---|---|
| 1 | Circle | $0 \leq \frac{r}{R} < 0.125$ | 0 | 0 | 0 |
| 2 | DU 40 | $0.125 \leq \frac{r}{R} < 0.225$ | 59.6 | 0.86 | 5 |
| 3 | DU 35 | $0.225 \leq \frac{r}{R} < 0.375$ | 90.2 | 1.26 | 8 |
| 4 | DU 30 | $0.375 \leq \frac{r}{R} < 0.475$ | 96.5 | 1.25 | 8 |
| 5 | DU 25 | $0.475 \leq \frac{r}{R} < 0.675$ | 134.6 | 1.06 | 5 |
| 6 | NACA $63_6$-621 | $0.675 \leq \frac{r}{R} < 0.825$ | 144.9 | 1.07 | 5 |
| 7 | NACA $63_6$-618 | $0.825 \leq \frac{r}{R} \leq 1.0$ | 62.8 | 0.86 | 4 |

Figure 7:
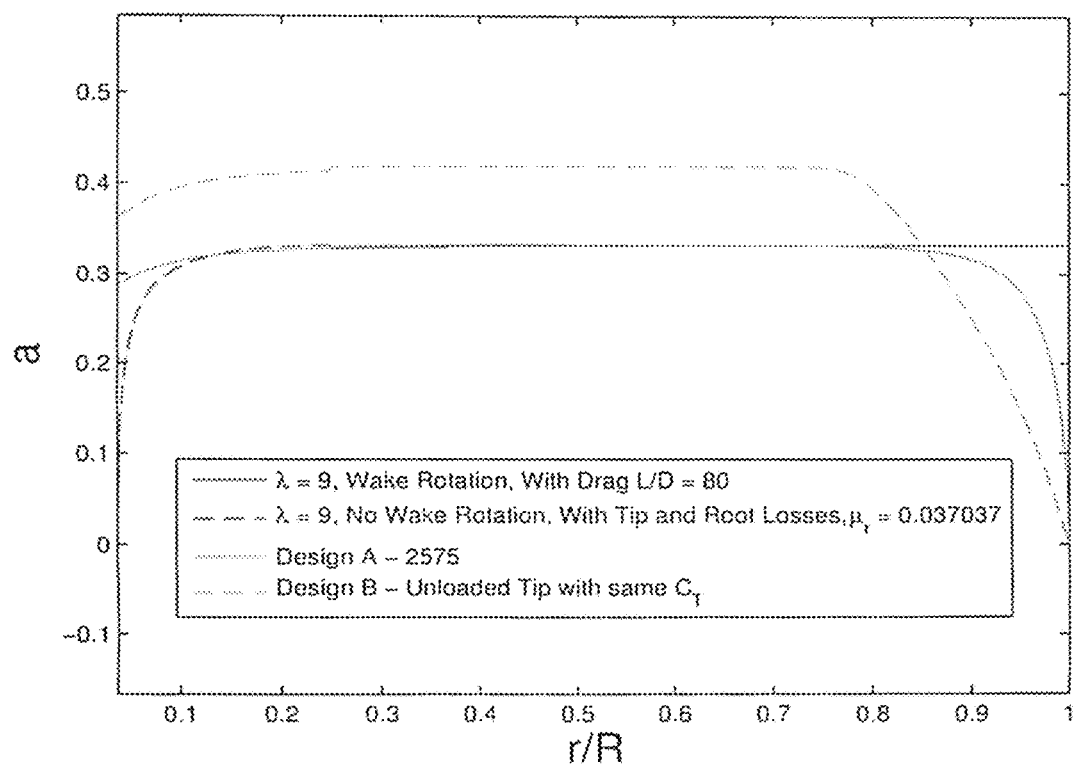
FIG. 7 shows axial induction as an azimuthal average, first for Blade A designs with different theoretical assumptions, then axial induction for Design A including both presented effects, and axial induction for Blade B of an embodiment of the present disclosure.

Different flow physics are included into blade element momentum theory (BEMT) such as the effect of wake rotation, drag, and losses modeled using the Prandtl tip loss model. The Prandtl tip loss model is a standard modification to BEMT that gives better agreement between theory and experiments on wind turbine aerodynamics and is caused by the tip vortex shed from each blade. The formulation of these effects and the conservation equations are shown in Burton et al ("Wind Energy Handbook," 2001). To achieve a maximum power coefficient at a tip-speed-ratio of 9, the axial induction factors (azimuthal averages) to maximize $C_P$ are shown in FIG. 7.

The axial induction factor used on the first 25% of the blade span was from including the effects of drag and wake rotation. For the outer 75% of the blade span, the axial induction factor was from Prandtl's tip loss model. This induction factor distribution for Design A is called '2575' and is seen in FIG. 7.

The chord and twist of the blade which produces the target axial induction factor can be found according to the following relationships seen in Jamieson, ("Innovation in Wind Turbine Design", 2011) and summarized in the following equations. Let r/R be spanwise location, F is tip loss factor, k=L/D, and B=3 are the number of blades. First the tangential induction factor was calculated based on the target a, $C_l$, and L/D from Table 1 according to $$a'\left(\lambda, \frac{r}{R}\right) = \frac{\left[\lambda^2 k^2 \left(\frac{r}{R}\right)^2 + 2\lambda k \frac{r}{R} - 4ak\left[\lambda \frac{r}{R} - k(1-a)\right] + 1\right]^{0.5} - \left(\lambda k \frac{r}{R} + 1\right)}{2\lambda k \frac{r}{R}}. \quad (1)$$

The blade geometry parameter, $(\Lambda)(\lambda, r/R)$, is useful for calculating the chord and was found according to $$\Lambda\left(\lambda, \frac{r}{R}\right) = \quad (2)$$

$$\frac{8\pi a(1-a)}{B\lambda(1+a')\sqrt{(1-a)^2 + \lambda^2\left(\frac{r}{R}\right)^2(1+a')^2}} \cdot \left[1 + \frac{F(1-a)}{k\lambda\frac{r}{R}(1+a')}\right].$$

The normalized chord is the geometry parameter divided by the lift coefficient $$\frac{c}{R} = \frac{\Lambda\left(\lambda, \frac{r}{R}\right)}{C_l\left(\frac{r}{R}\right)}, \quad (3)$$

and is tabulated in Table 4 (see below).

The required blade twist, $\beta$, to ensure each blade element is operating at the target angles of attack, $\alpha$, was found and is tabulated in Table 4.

$$\beta = \arcsin\left(\frac{1-a}{\sqrt{(1-a)^2 + \lambda^2\left(\frac{r}{R}\right)^2(1+a')^2}}\right) - \alpha \quad (4)$$

Figure 8:
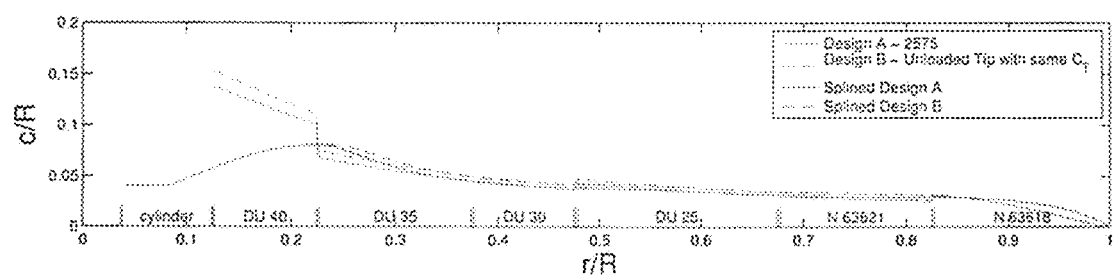
FIG. 8 shows a plot of normalized chord distributions for Designs A and B before and after spline fits.
Figure 9:
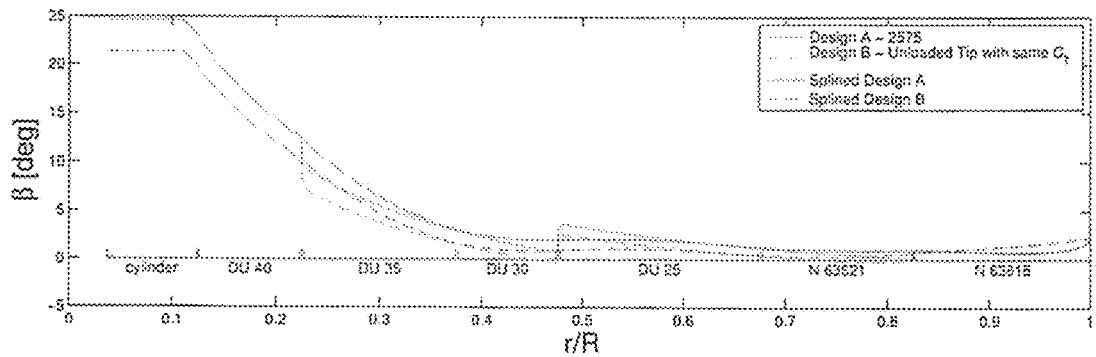
FIG. 9 shows blade twist for Designs A and B before and after spline fits.

Due to the abrupt changes in airfoil sections along the blade span, these equations lead to steps in chord and twist, seen as red lines in FIGS. 2 and 3. This does not lead to a manufacturable blade. The chord and twist was then smoothed with interpolating splines between airfoil transitions along the blade span. The transition near the hub from the ideal large chord to a cylinder at the hub interface was made to match common blade designs inboard of the 25% normalized span location. These are the green lines of FIGS. 8 and 9. Table 4 consists of chord and twist values after smoothing.

Novel Blade B design—Unloaded Tip

Figure 10:
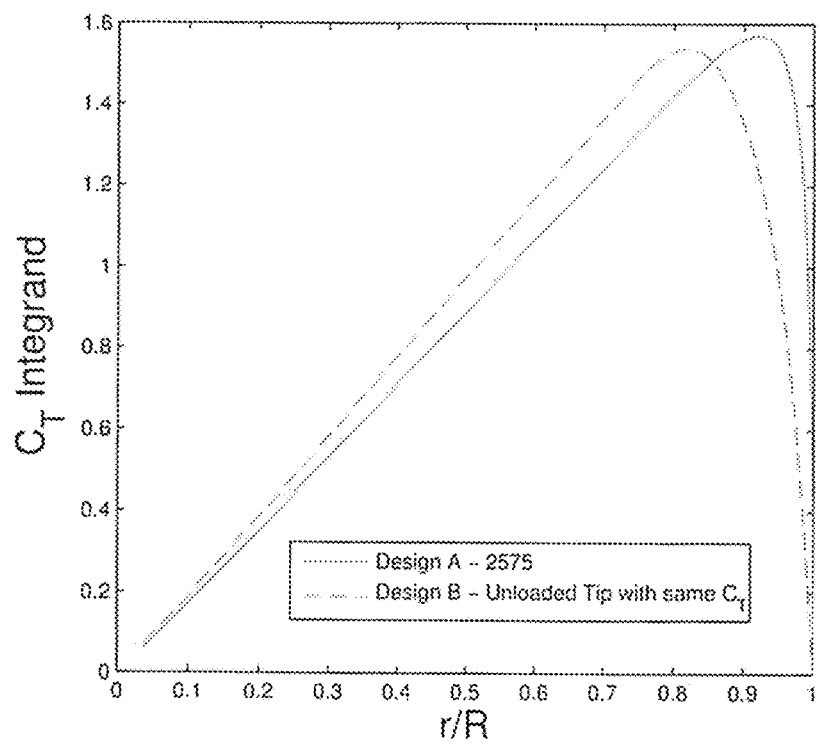
FIG. 10 shows a plot of thrust coefficient per length showing equal area under the curve and hence equal total thrust for Blades A and B.

FIG. 6 also illustrates Blade B, which is an embodiment according to the present disclosure. Blade B was designed to have the same thrust coefficient predicted from theory as design A, however, with an unloaded tip. Therefore the ideal axial induction factor of design A was lowered with a spline starting at the 75% span location. To keep the thrust coefficient the same, the entire new and tip unloaded a(r/R) distribution was multiplied by a constant (C) slightly larger than 1, such that integrating $8(r/R)C\cdot a(1-C\cdot a)=C_T$ of design A. The constant C=1.2572 lead to equal theoretical thrust coefficients $C_T$=0.857. FIG. 10 shows the integrand in finding the thrust coefficient, and it can be seen the difference in area between the two designs is zero.

Therefore, Blade B has a highly loaded blade (a>⅓) over the first 75% of the span, and an unloaded tip (a<⅓) over the outer 25% of the blade. The non-dimensional circulation distribution is proportional to the actual lift force across the blade span and can be calculated.

$$\Gamma' = \frac{\Gamma}{4\pi U_\infty R} = \frac{1}{\lambda}a(1-a). \quad (5)$$

Figure 11:
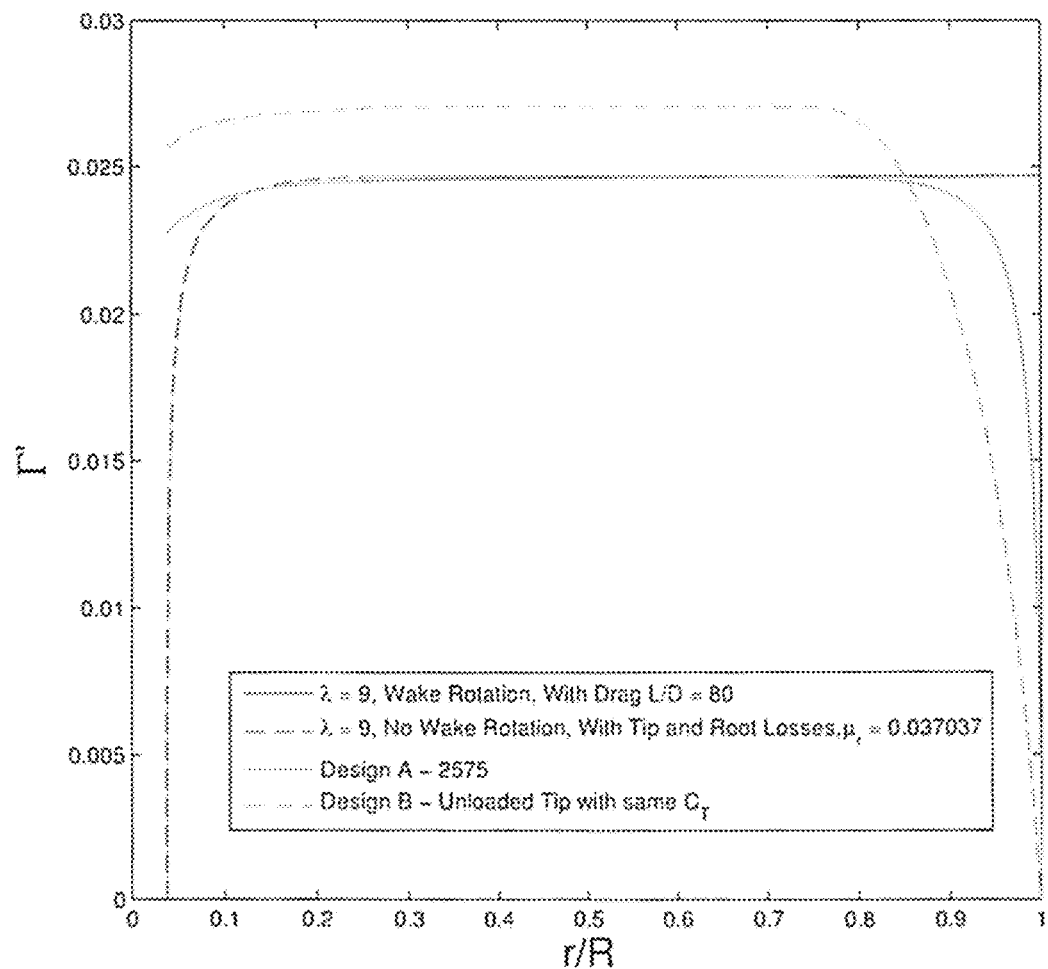
FIG. 11 shows a plot of dimensionless circulation showing greater inboard loading and less outboard loading for Blade B.

The results of plotting the non-dimensional circulation distribution against the blade span is shown in FIG. 11.

Figure 12:
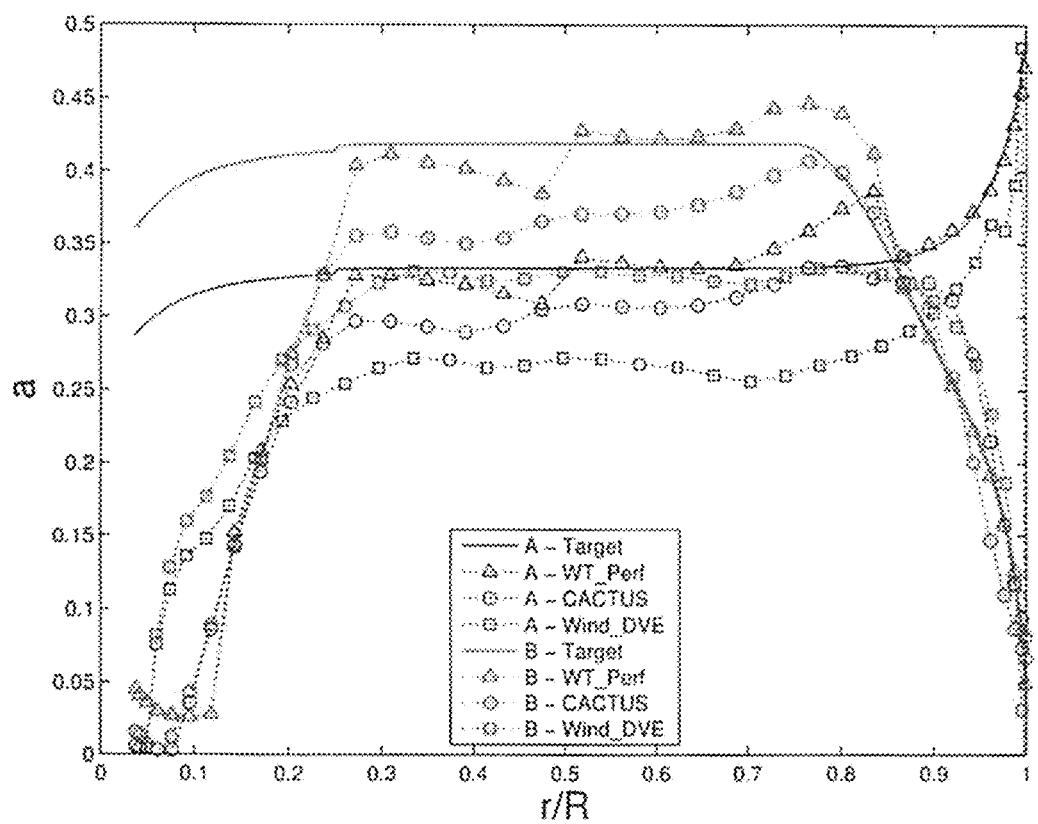
FIG. 12 shows a comparison of target and model predicted axial induction factors, relative to blade for conventional Blade A and Blade B according to an embodiment of the disclosure.

As seen in FIG. 12, design B has higher loading across the first 75% of the span, and is unloaded near the tip. This means that design B has larger chord and less twist inboard, and less chord and higher twist outboard compared to design A. This produces a suboptimal power coefficient for design B. Two blade designs with the same thrust coefficient and different load distributions help answer the question of wake sensitivity. In addition, the axial induction factors can be checked against their intended targets comparing vortex methods to BEMT.

The final characteristics of Designs A and B are shown in Table 2. The associated chord, twist, and airfoils can be found in Tables 4 and 5.

TABLE 2

Blade A and Blade B Design Summary

| Design | R (m) | Power$_{\Omega R=75}$ (kW) | $C_P$ | $C_T$ | $U_\infty$ (m/s) | $\lambda_{design}$ | $\Omega R$ (m/s) | $\Omega$ (rad/s) |
|---|---|---|---|---|---|---|---|---|
| A | 13.50 | 97.82 | 0.482 | 0.857 | 8.33 | 9 | 75 | 5.56 |
| B | 13.50 | 90.94 | 0.448 | 0.857 | 8.33 | 9 | 75 | 5.56 |

EXAMPLE RESULTS

Figure 13:
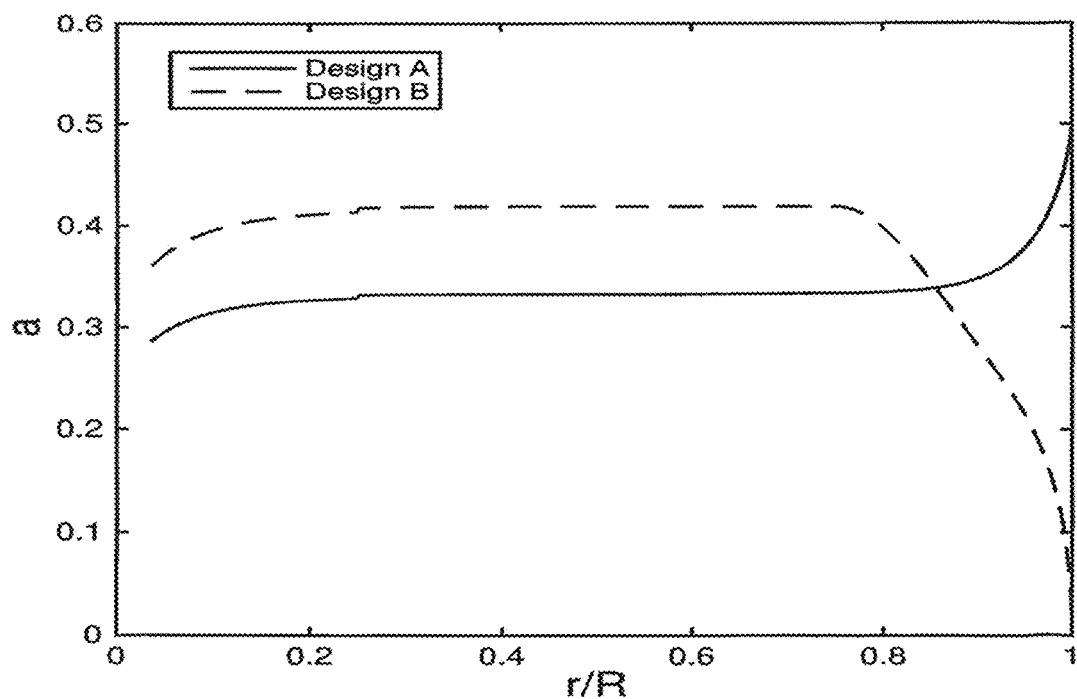
FIG. 13 shows the axial induction relative to the blade for conventional Blade A and Blade B according to an embodiment of the disclosure.

The proposed designs were input into both a blade element momentum theory code, WT Perf, and vortex free-wake codes, CACTUS and Wind DVE. Since the governing equations used to design the blade are nearly identical to those included in WT Perf, the simulation matched the target axial induction factors shown in FIG. 13. The only discrepancies were due the spline fit through regions where airfoils changed section shape, leading to a chord and twist that matches the target design only at the tip and near the center of each airfoil region. It should be noted that the target values in FIG. 13 include the tip loss model, whereas the targets in FIG. 7 were azimuthal averages (not including tip loss model.)

The vortex methods predicted a lower axial induction factor across the majority of the blade span. As the number of wake elements grows, the axial induction factor rises and convergences to a solution for uniform inflow. However, a total of 30 revolutions were used in the vortex solutions for rotor performance so this did not explain the lower axial induction factors. This discrepancy between low and mid-fidelity modeling is common. The solution that agrees more with experiment remains an open question.

The integrated loads across the blade span predicted power and thrust coefficients. These were tabulated in Table 3. Design B has a lower efficiency as expected. CACTUS predicts an average power coefficient 9% higher and an average thrust coefficient 2% lower than blade element momentum theory. The thrust coefficient for design B as predicted by CACTUS is 4% higher than A, even though the thrust coefficients were intended to be identical.

TABLE 3

Blade A and B Performance, at $\lambda = 9$

| Design | $C_P$ Target | $C_P$ CACTUS | $C_T$ Target | $C_T$ CACTUS |
|---|---|---|---|---|
| A | 0.482 | 0.511 | 0.857 | 0.821 |
| B | 0.448 | 0.501 | 0.857 | 0.853 |

Figure 14:
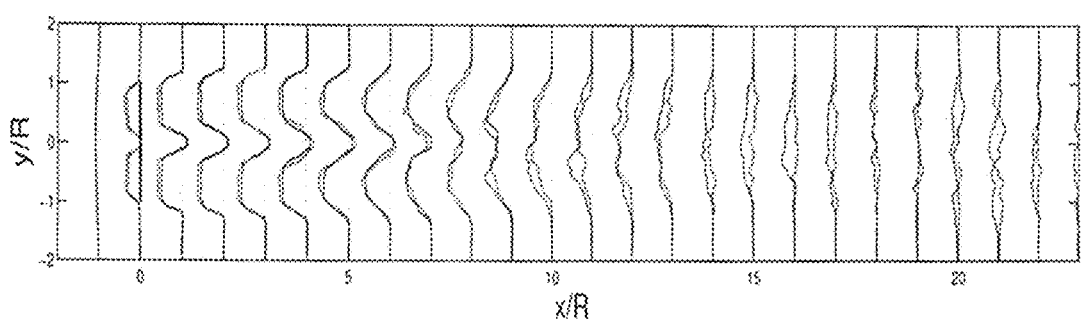
FIG. 14 shows time averaged axial velocity profiles in wake for conventional Blade A and Blade B according to an embodiment of the disclosure.

The wake was simulated in CACTUS for 120 revolutions, or approximately 80 rotor radii of freestream convection. FIG. 14 shows the streamwise velocity deficits for Designs A and B as the profile evolves downstream of the rotor plane, at z/R=0.

Figure 15:
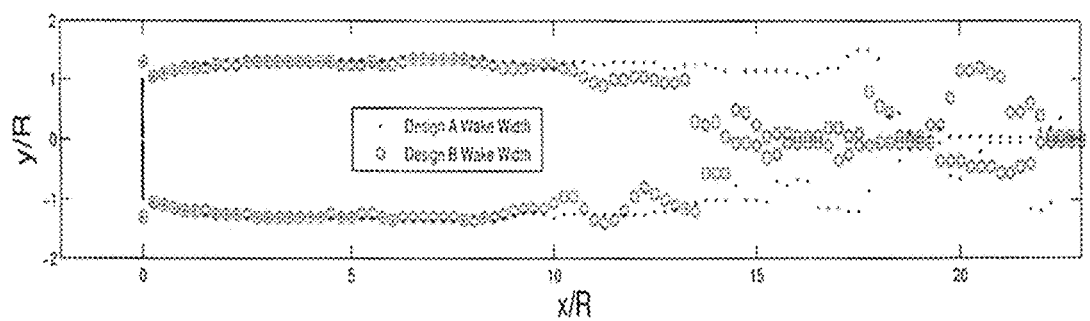
FIG. 15 shows the wake edges for conventional Blade A and Blade B according to an embodiment of the disclosure.

FIG. 15 shows the wake width for the two blade designs. As plotted, the wake edge is defined as the upper and lower y/R locations where the time averaged axial velocity has exceeded 99% of the freestream velocity. The linear expansion of the near wake is observed until x/R=7.9 for design A, and x/R=8.0 for design B.

The mid-wake region for design A is more stable. The wake edge contracts slowly without meandering for design A until x/R=17.9. The wake edge collapses more quickly for design B at x/R=13.4. Beyond these axial locations large coherent structures have transported freestream momentum all the way to the center of the far wake. This is good indication that design B has reduced the distance at which a second wind turbine can be placed due to a different loading distribution.

Figure 16:
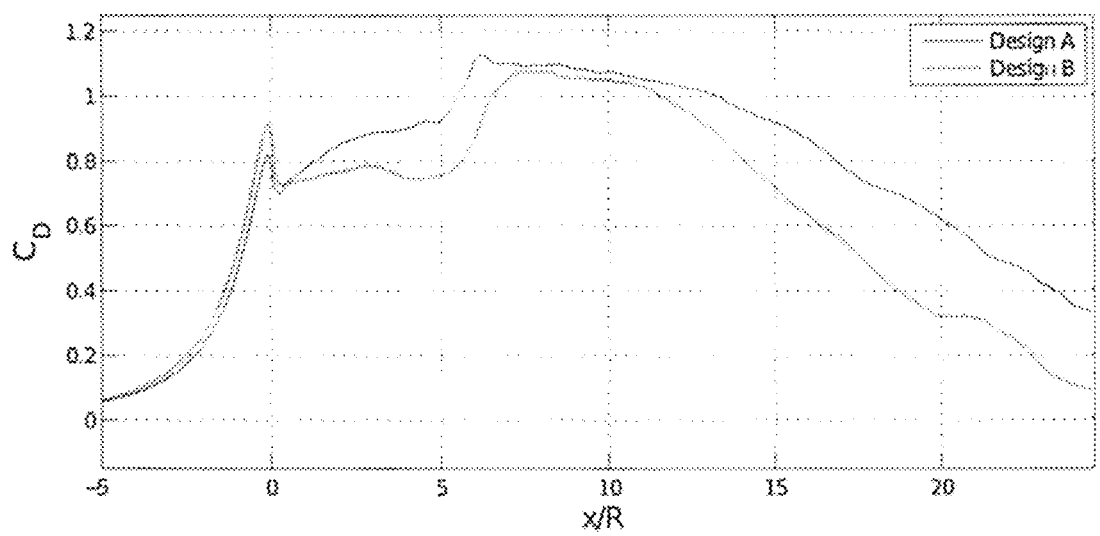
FIG. 16 shows the momentum in the wake behind Blade A and Blade B.

The thrust coefficient (equal to the drag coefficient ($C_D$)) which is a measure of the wake momentum deficit relative to the freestream and is presented in FIG. 16. The maximum momentum deficit location for each design corresponds well to the wake edge plot and the transition from the near-wake to the mid-wake. At the start of the mid-wake region, shear layer mixing transports high momentum fluid down into the low momentum wake, along with vortex stretching and pairing. The greatest deficit is at x/R=7.8 for design A and x/R=7.5 for design B. Most notable is the momentum recovery in the mid-wake for design B, indicating that a highly loaded root and unloaded tip has a shorter and faster mixing wake than a blade designed to have the same total drag as a maximum power rotor. The momentum deficit is down to 1% of the freestream by x/R=15.8 for B and x/R=19.0 for A, a difference of over one rotor diameter.

Time averaged vorticity contours for Blades A and B show that the out of plane vorticity in the near-wake is contained to the root and tip regions because these are the locations where the bound circulation changes most rapidly. The spreading of the shear layer corresponds to the mixing and spreading of flow structures, diffusion of turbulence, and mixing from the freestream into the low momentum wake. The merging of the root and tip vorticity is near x/R=7.5 for A, and x/R=5 for B, again confirming that greater mixing is occurring closer downstream in design B.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:
1. A turbine blade, comprising:
an inboard region; and
an outboard region;
wherein the inboard region has an induction factor of between ⅓ and ½ at a tip speed ratio of 9; and wherein the tangential induction factor is calculated by $$a'\left(\lambda, \frac{r}{R}\right) = \frac{\left[\lambda^2 k^2\left(\frac{r}{R}\right)^2 + 2\lambda k\frac{r}{R} - 4ak\left[\lambda\frac{r}{R} - k(1-a)\right] + 1\right]^{0.5} - \left(\lambda k\frac{r}{R} + 1\right)}{2\lambda k\frac{r}{R}} \quad (1)$$

and wherein the blade geometry parameter is calculated by $$\Lambda\left(\lambda, \frac{r}{R}\right) = \frac{8\pi a(1-a)}{B\lambda(1+a')\sqrt{(1-a)^2 + \lambda^2\left(\frac{r}{R}\right)^2(1+a')^2}} \left[1 + \frac{(1-a)}{k\lambda\frac{r}{R}(1+a')}\right], \quad (2)$$

and wherein the normalized chord is calculated by $$\frac{c}{R} = \frac{\Lambda\left(\lambda, \frac{r}{R}\right)}{C_l\left(\frac{r}{R}\right)}, \quad (3)$$

and wherein the blade twist is calculated by $$\beta = \arcsin\left(\frac{1-a}{\sqrt{(1-a)^2 + \lambda^2\left(\frac{r}{R}\right)^2(1+a')^2}}\right) - \alpha \quad (4)$$

and wherein parameters are defined as found in this disclosure.

2. The turbine blade of claim 1, wherein the outboard region has an average induction value of no less than 0 and no greater than ⅓.

3. The turbine blade of claim 1, wherein the inboard region has an induction factor of between 0.35 and 0.45.

4. The turbine blade of claim 1, further comprising:
a base at a first end of the inboard region;
a tip at a first end of the outboard region; and
a length extending from the base at the first end of the inboard region to the tip at the first end of the outboard region;
wherein the outboard region is between 3% and 40% of the length.

5. The turbine blade of claim 4, wherein the outboard region is between 15% and 25% of the length.

6. The turbine of claim 4, wherein the inboard region is between 60% and 97% of the length.

7. The turbine blade of claim 1, wherein the outboard region comprises at least one region using a NACA 63$_6$-618 airfoil.

8. A wind turbine, comprising:
at least one turbine blade, comprising:
an inboard region; and
an outboard region;
wherein the inboard region has an induction factor of between ⅓ and ½ at a tip speed ratio of 9; and wherein the tangential induction factor is calculated by $$a'\left(\lambda, \frac{r}{R}\right) = \frac{\left[\lambda^2 k^2\left(\frac{r}{R}\right)^2 + 2\lambda k\frac{r}{R} - 4ak\left[\lambda\frac{r}{R} - k(1-a)\right] + 1\right]^{0.5} - \left(\lambda k\frac{r}{R} + 1\right)}{2\lambda k\frac{r}{R}}. \quad (1)$$

and wherein the blade geometry parameter is calculated by $$\Lambda\left(\lambda, \frac{r}{R}\right) = \frac{8\pi a(1-a)}{B\lambda(1+a')\sqrt{(1-a)^2 + \lambda^2\left(\frac{r}{R}\right)^2(1+a')^2}} \left[1 + \frac{(1-a)}{k\lambda\frac{r}{R}(1+a')}\right], \quad (2)$$

and wherein the normalized chord is calculated by $$\frac{c}{R} = \frac{\Lambda\left(\lambda, \frac{r}{R}\right)}{C_l\left(\frac{r}{R}\right)}, \quad (3)$$

and wherein the blade twist is calculated by $$\beta = \arcsin\left(\frac{1-a}{\sqrt{(1-a)^2 + \lambda^2\left(\frac{r}{R}\right)^2(1+a')^2}}\right) - \alpha \quad (4)$$

and wherein parameters are defined as found in this disclosure.

9. The turbine blade of claim 8, wherein the outboard region has an average induction value of no less than 0 and no greater than ⅓.

10. The turbine blade of claim 8, wherein the inboard region has an induction factor of between 0.35 and 0.45.

11. The turbine blade of claim 8, further comprising:
a base at a first end of the inboard region;
a tip at a first end of the outboard region; and
a length extending from the base at the first end of the inboard region to the tip at the first end of the outboard region;
wherein the outboard region is between 3% and 40% of the length.

12. The turbine blade of claim 11, wherein the outboard region is between 15% and 25% of the length.

13. The turbine of claim 11, wherein the inboard region is between 60% and 97% of the length.

14. The turbine blade of claim 8, wherein the outboard region comprises at least one region using a NACA 63$_6$-618 airfoil.

15. A wind farm, comprising:
two or more wind turbines of claim 8.

* * * * *